(12) United States Patent
Leonardi et al.

(10) Patent No.: US 11,843,281 B2
(45) Date of Patent: Dec. 12, 2023

(54) ELECTRIC MACHINE FOR VEHICLE

(71) Applicant: FORD GLOBAL TECHNOLOGIES, LLC, Dearborn, MI (US)

(72) Inventors: Franco Leonardi, Dearborn Heights, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/491,890

(22) Filed: Oct. 1, 2021

(65) Prior Publication Data

US 2023/0107498 A1   Apr. 6, 2023

(51) Int. Cl.
*H02K 1/20* (2006.01)
*H02K 9/19* (2006.01)

(52) U.S. Cl.
CPC ............. *H02K 1/20* (2013.01); *H02K 9/19* (2013.01)

(58) Field of Classification Search
CPC ................................ H02K 1/20; H02K 9/19
See application file for complete search history.

(56) References Cited

U.S. PATENT DOCUMENTS

| | | | |
|---|---|---|---|
| 1,882,487 A | 10/1932 | Dupont | |
| 2,804,341 A | 8/1957 | Bete | |
| 4,971,184 A | 11/1990 | Ederman | |
| 7,566,999 B2 | 7/2009 | Neal | |
| 8,519,580 B2 | 8/2013 | Brandl et al. | |
| 10,020,706 B2 | 7/2018 | Kobes et al. | |
| 2012/0091838 A1 | 4/2012 | Miyamoto et al. | |
| 2013/0285485 A1 | 10/2013 | Song et al. | |
| 2014/0265666 A1 | 9/2014 | Shoykhet et al. | |
| 2014/0339934 A1* | 11/2014 | Yoshiizumi | H02K 5/203 310/54 |
| 2016/0380490 A1 | 12/2016 | Mcclelland et al. | |
| 2017/0310189 A1 | 10/2017 | Hanumalagutti et al. | |
| 2018/0131247 A1 | 5/2018 | Froehlich et al. | |
| 2019/0273420 A1* | 9/2019 | Yasuda | H02K 1/20 |
| 2020/0204044 A1* | 6/2020 | Lee | H02K 1/20 |

(Continued)

FOREIGN PATENT DOCUMENTS

| | | | |
|---|---|---|---|
| CN | 203608051 U | 5/2014 | |
| DE | 19823586 A1 * | 11/1999 | ............ H02K 1/20 |
| DE | 102011076904 A1 | 12/2012 | |

(Continued)

OTHER PUBLICATIONS

Beneke (DE 19823586 A1) English Translation (Year: 1999).*

*Primary Examiner* — Tulsidas C Patel
*Assistant Examiner* — Robert E Mates
(74) *Attorney, Agent, or Firm* — David B Kelley; Brooks Kushman P.C.

(57) ABSTRACT

A vehicle electric machine includes a housing and a stator having windings and a stator core. The core defines a plurality of axially extending cooling channels each having an entrance port at one end of the stator and an exit port at the other end of the stator. An end cover is connected to a first end of the housing defining a recessed cavity configured to receive the windings and defines an arcuate inlet manifold channel that extends in a circumferential direction of the stator to partially circumscribe the first cavity and that is in fluid communication with first ones of the axial cooling channels.

18 Claims, 6 Drawing Sheets

(56) References Cited

U.S. PATENT DOCUMENTS

2022/0393526 A1  12/2022  Jelinewski et al.

FOREIGN PATENT DOCUMENTS

| | | | |
|---|---|---|---|
| DE | 102013205132 A1 | 9/2014 | |
| DE | 102019216125 A1 | 4/2021 | |
| EP | 220349 A1 | 5/1987 | |
| EP | 581966 A1 * | 2/1994 | ............... H02K 1/20 |
| GB | 2394367 A | 4/2004 | |
| JP | 2021141703 A | 9/2021 | |
| RU | 2318289 C1 | 2/2008 | |

\* cited by examiner

ELECTRIC MACHINE FOR VEHICLE

TECHNICAL FIELD

The present disclosure relates to electric machines, for use with electric and hybrid-electric vehicles, that are capable of acting either as a motor or as a generator.

BACKGROUND

Vehicles such as battery-electric vehicles and hybrid-electric vehicles contain a traction-battery assembly to act as an energy source. The traction-battery assembly, for example, is electrically connected to an electric machine that provides torque to driven wheels. The traction-battery assembly may include components and systems to assist in managing vehicle performance and operations. It may also include high-voltage components, and an air or liquid thermal-management system to control temperature.

Electric machines typically include a stator and a rotor that cooperate to convert electrical energy into mechanical motion or vice versa. Electric machines may include thermal-management systems to cool the stator, rotor, or both.

SUMMARY

According to one embodiment, a vehicle electric machine includes a housing, a stator disposed in the housing and having teeth defining a plurality of axially extending slots supporting windings and further defining axially extending cooling channels each having an entrance port at one end of the stator and an exit port at the other end of the stator. A first end cover is connected to a first end of the housing defining a recessed first cavity configured to receive the windings and defining an arcuate inlet manifold channel that extends in a circumferential direction of the stator to partially circumscribe the first cavity. A second end cover is connected to a second end of the housing and defines a recessed second cavity configured to receive the windings and defining an arcuate outlet manifold channel that extends in the circumferential direction to partially circumscribe the second cavity. Wherein, first ones of the axial cooling channels have their entrance ports opening into the inlet manifold channel and their exit ports opening into the outlet manifold channel to form a cooling circuit configured to cool the electric machine.

According to another embodiment, a vehicle electric machine includes a housing and a stator having windings and a stator core. The core defines a plurality of axially extending cooling channels each having an entrance port at one end of the stator and an exit port at the other end of the stator. An end cover is connected to a first end of the housing defining a recessed cavity configured to receive the windings and defines an arcuate inlet manifold channel that extends in a circumferential direction of the stator to partially circumscribe the first cavity and that is in fluid communication with first ones of the axial cooling channels.

According to yet another embodiment, a vehicle electric machine has a housing and a stator core disposed in the housing. The stator core has mounting portions each defining at least one axial cooling channel. Windings are disposed on the stator core. A first end cover is connected to a first end of the housing and defines a recessed first cavity configured to receive the windings and defining an arcuate inlet manifold channel that extends in a circumferential direction of the stator core to partially circumscribe the first cavity. A second end cover is connected to a second end of the housing and defines a recessed second cavity configured to receive the windings and defining an arcuate outlet manifold channel that extends in the circumferential direction to partially circumscribe the second cavity. Select ones of the axial cooling channels connect between the inlet manifold channel and the outlet manifold channel.

DETAILED DESCRIPTION

Figure 1:
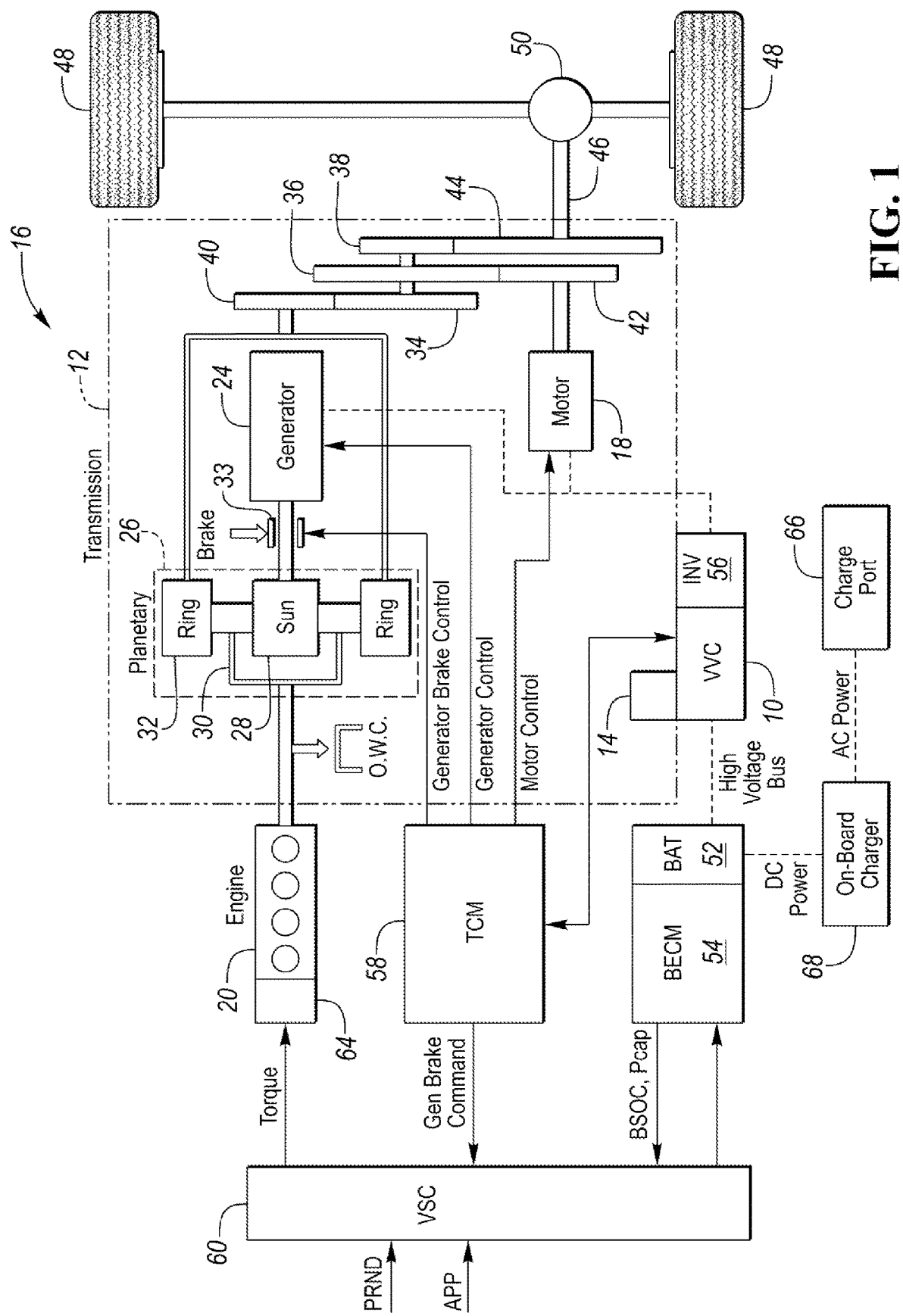
FIG. 1 is a schematic diagram of an example hybrid vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis. The terms "front," "rear," "upper" and "lower" designate directions in the drawings to which reference is made. The terms, connected, attached, etc., refer to directly or indirectly connected, attached, etc., unless otherwise indicated explicitly or by context.

An example plugin-hybrid-electric vehicle (PHEV) is depicted in FIG. 1 and referred to generally as a vehicle 16. The vehicle 16 includes a transmission 12 and is propelled by at least one electric machine 18 with selective assistance from an internal combustion engine 20. The electric machine 18 may be an alternating current (AC) electric motor depicted as "motor" 18 in FIG. 1. The electric machine 18 receives electrical power and provides torque for vehicle propulsion. The electric machine 18 also functions as a generator for converting mechanical power into electrical power through regenerative braking.

The transmission 12 may be a power-split configuration. The transmission 12 includes the first electric machine 18 and a second electric machine 24. The second electric machine 24 may be an AC electric motor depicted as "generator" 24 in FIG. 1. Like the first electric machine 18, the second electric machine 24 receives electrical power and provides output torque. The second electric machine 24 also functions as a generator for converting mechanical power into electrical power and optimizing power flow through the transmission 12. In other embodiments, the transmission does not have a power-split configuration.

The transmission 12 may include a planetary gear unit 26, which includes a sun gear 28, a planet carrier 30, and a ring gear 32. The sun gear 28 is connected to an output shaft of the second electric machine 24 for receiving generator torque. The planet carrier 30 is connected to an output shaft of the engine 20 for receiving engine torque. The planetary gear unit 26 combines the generator torque and the engine torque and provides a combined output torque about the ring gear 32. The planetary gear unit 26 functions as a continuously variable transmission, without any fixed or "step" ratios.

The transmission 12 may also include a one-way clutch (O.W.C.) and a generator brake 33. The O.W.C. is coupled to the output shaft of the engine 20 to only allow the output shaft to rotate in one direction. The O.W.C. prevents the transmission 12 from back-driving the engine 20. The generator brake 33 is coupled to the output shaft of the second electric machine 24. The generator brake 33 may be activated to "brake" or prevent rotation of the output shaft of the second electric machine 24 and of the sun gear 28. Alternatively, the O.W.C. and the generator brake 33 may be eliminated and replaced by control strategies for the engine 20 and the second electric machine 24.

The transmission 12 may further include a countershaft having intermediate gears including a first gear 34, a second gear 36 and a third gear 38. A planetary output gear 40 is connected to the ring gear 32. The planetary output gear 40 meshes with the first gear 34 for transferring torque between the planetary gear unit 26 and the countershaft. An output gear 42 is connected to an output shaft of the first electric machine 18. The output gear 42 meshes with the second gear 36 for transferring torque between the first electric machine 18 and the countershaft. A transmission output gear 44 is connected to a driveshaft 46. The driveshaft 46 is coupled to a pair of driven wheels 48 through a differential 50. The transmission output gear 44 meshes with the third gear 38 for transferring torque between the transmission 12 and the driven wheels 48.

The vehicle 16 includes an energy storage device, such as a traction battery 52 for storing electrical energy. The battery 52 is a high-voltage battery that is capable of outputting electrical power to operate the first electric machine 18 and the second electric machine 24. The battery 52 also receives electrical power from the first electric machine 18 and the second electric machine 24 when they are operating as generators. The battery 52 is a battery pack made up of several battery modules (not shown), where each battery module contains a plurality of battery cells (not shown). Other embodiments of the vehicle 16 contemplate different types of energy storage devices, such as capacitors and fuel cells (not shown) that supplement or replace the battery 52.

A high-voltage bus electrically connects the battery 52 to the first electric machine 18 and to the second electric machine 24.

The vehicle includes a battery energy control module (BECM) 54 for controlling the battery 52. The BECM 54 receives input that is indicative of vehicle conditions and battery conditions, such as battery temperature, voltage and current. The BECM 54 calculates and estimates battery parameters, such as battery state of charge and the battery power capability. The BECM 54 provides output (BSOC, $P_{cap}$) that is indicative of a battery state of charge (BSOC) and a battery power capability ($P_{cap}$) to other vehicle systems and controllers.

The vehicle 16 includes a DC-DC converter or variable voltage converter (VVC) 10 and an inverter 56. The VVC 10 and the inverter 56 are electrically connected between the traction battery 52 and the first electric machine 18, and between the battery 52 and the second electric machine 24. The VVC 10 "boosts" or increases the voltage potential of the electrical power provided by the battery 52. The VVC 10 also "bucks" or decreases the voltage potential of the electrical power provided to the battery 52, according to one or more embodiments. The inverter 56 inverts the DC power supplied by the main battery 52 (through the VVC 10) to AC power for operating the electric machines 18, 24. The inverter 56 also rectifies AC power provided by the electric machines 18, 24, to DC for charging the traction battery 52. Other embodiments of the transmission 12 include multiple inverters (not shown), such as one invertor associated with each electric machine 18, 24. The VVC 10 includes an inductor assembly 14.

The transmission 12 includes a transmission control module (TCM) 58 for controlling the electric machines 18, 24, the VVC 10 and the inverter 56. The TCM 58 is configured to monitor, among other things, the position, speed, and power consumption of the electric machines 18, 24. The TCM 58 also monitors electrical parameters (e.g., voltage and current) at various locations within the VVC 10 and the inverter 56. The TCM 58 provides output signals corresponding to this information to other vehicle systems.

The vehicle 16 includes a vehicle system controller (VSC) 60 that communicates with other vehicle systems and controllers for coordinating their function. Although it is shown as a single controller, the VSC 60 may include multiple controllers that may be used to control multiple vehicle systems according to an overall vehicle control logic, or software.

The vehicle controllers, including the VSC 60 and the TCM 58 generally includes any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 60 communicates with other vehicle systems and controllers (e.g., the BECM 54 and the TCM 58) over one or more wired or wireless vehicle connections using common bus protocols (e.g., CAN and LIN). The VSC 60 receives input (PRND) that represents a current position of the transmission 12 (e.g., park, reverse, neutral or drive). The VSC 60 also receives input (APP) that represents an accelerator pedal position. The VSC 60 provides output that represents a desired wheel torque, desired engine speed, and generator brake command to the TCM 58, and contactor control to the BECM 54.

The vehicle 16 includes an engine control module (ECM) 64 for controlling the engine 20. The VSC 60 provides output (desired engine torque) to the ECM 64 that is based on a number of input signals including APP, and corresponds to a driver's request for vehicle propulsion.

If the vehicle 16 is a PHEV, the battery 52 may periodically receive AC energy from an external power supply or grid, via a charge port 66. The vehicle 16 also includes an on-board charger 68, which receives the AC energy from the charge port 66. The charger 68 is an AC/DC converter which converts the received AC energy into DC energy suitable for charging the battery 52. In turn, the charger 68 supplies the DC energy to the battery 52 during recharging. Although illustrated and described in the context of a PHEV 16, it is understood that the electric machines 18, 24 may be implemented on other types of electric vehicles, such as a hybrid-electric vehicle or a fully electric vehicle.

Figure 2:
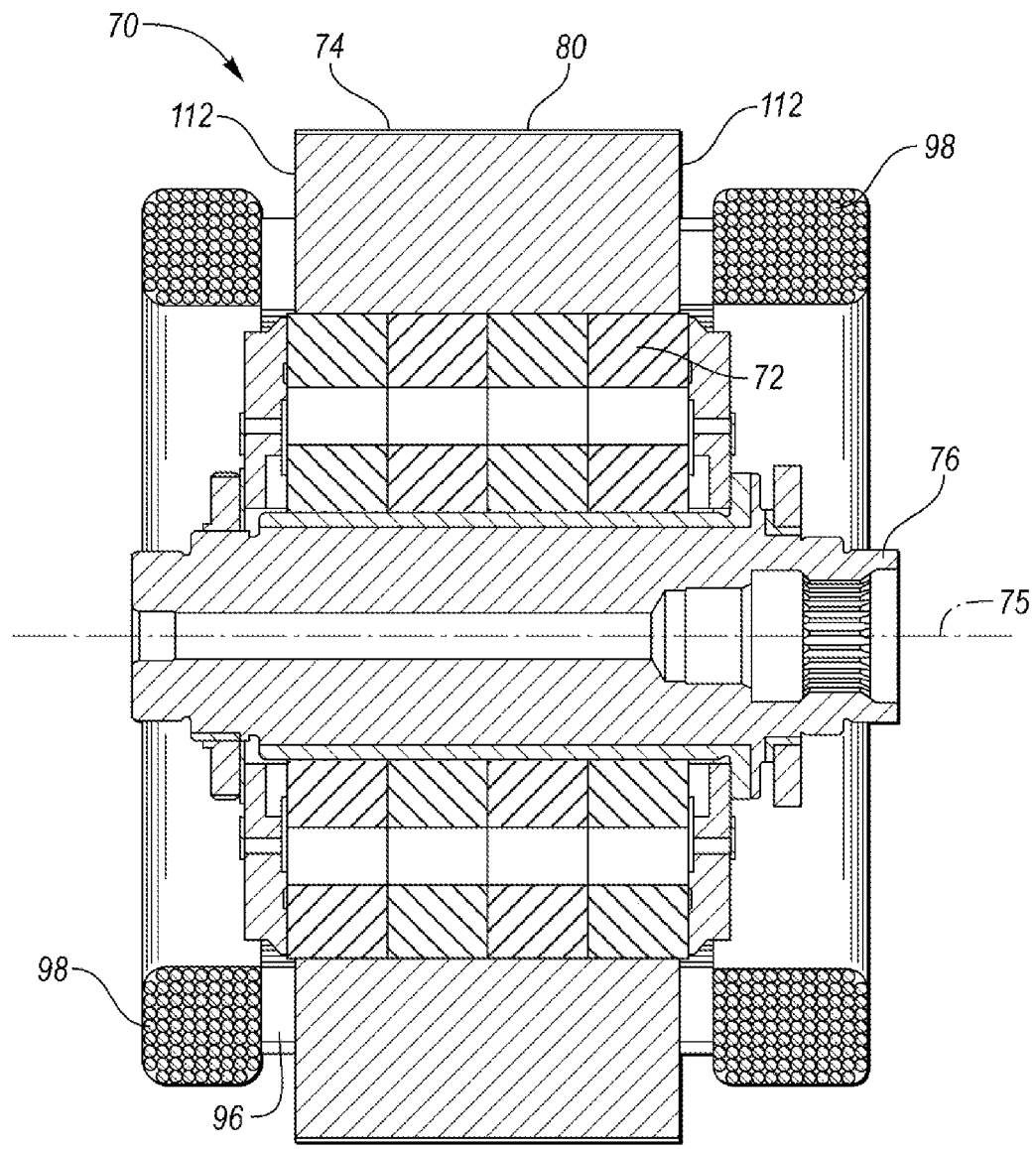
FIG. 2 is side view, in cross section, of a portion of an example electric machine.
Figure 3:
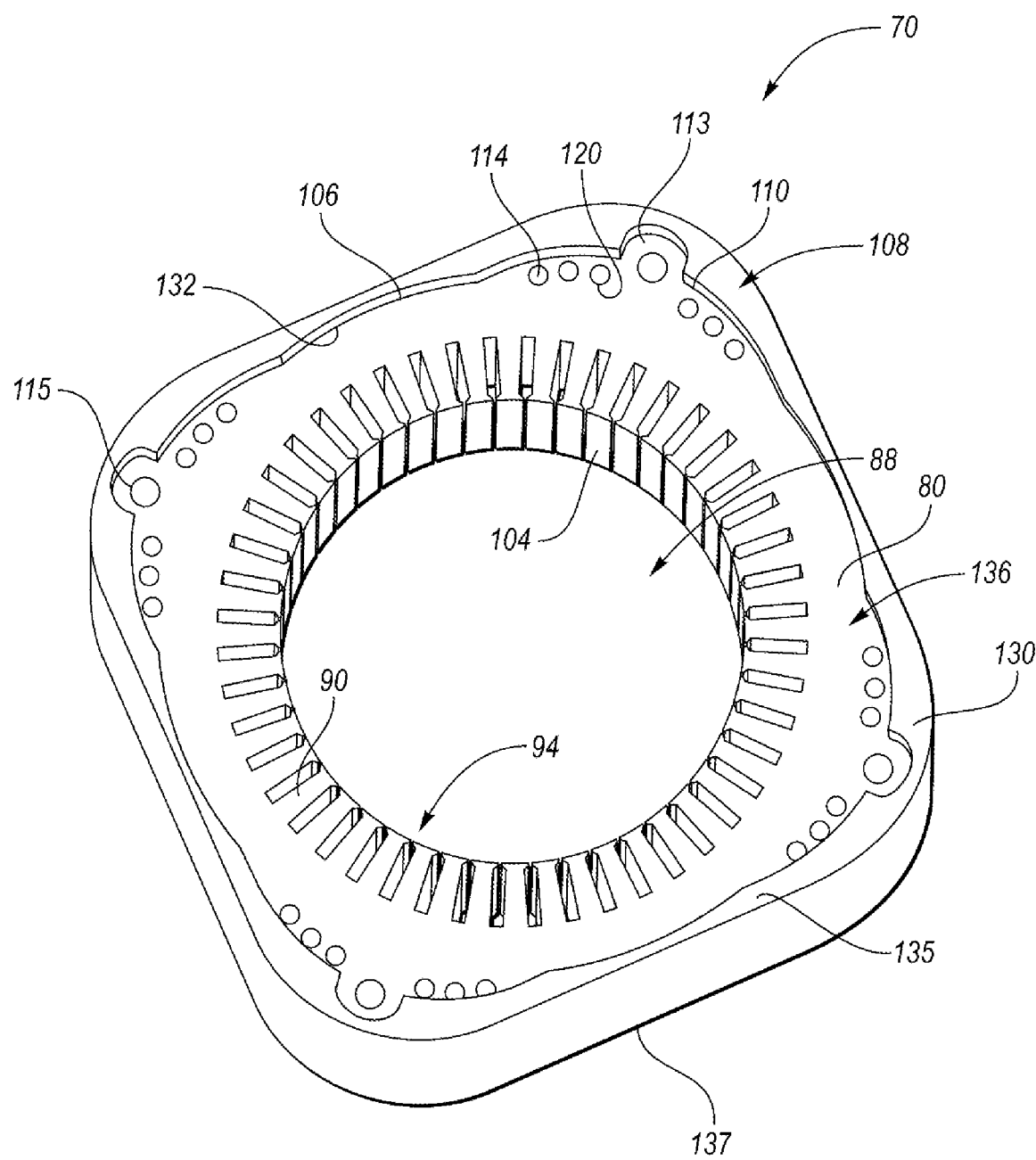
FIG. 3 is a perspective view of a stator core disposed in a housing.

Referring to FIGS. 2 and 3, an example electric machine 70 includes a stator 74 having a plurality of laminations 78. The electric machine 70 has a central axis 75. Each of the laminations 78 includes a front side and a back side. When stacked, the front and back sides are disposed against adjacent front and back sides to form a stator core 80. Each of the laminations 78 may define a hollow center.

Each lamination 78 includes an inner diameter defining a plurality of teeth extending radially inward toward the inner diameter. Adjacent teeth cooperate to define slots. The teeth and the slots of each lamination 78 are aligned with adjacent laminations to define teeth 90 and stator slots 94 extending axially through the stator core 80 between the opposing end faces 112. The end faces 112 define the opposing ends of the core 80 and are formed by the first and last laminations of the stator core 80. A plurality of windings (also known as coils, wires, or conductors) 96 are wrapped around the stator core 80 and are disposed within the stator slots 94. The windings 96 may be disposed in an insulating material (not shown). Portions of the windings 96 generally extend in an axial direction along the stator slots 94. At the end faces 112 of the stator core 80, the windings bend to extend circumferentially around the end faces 112 of the stator core 80 forming the end windings 98. While shown as having distributed windings, the windings could also be of the concentrated or hairpin type.

A rotor 72 is disposed within the cavity 88 of the stator 70. The rotor 72 is fixed to a shaft 76 that is operably connected to the gearbox. When current is supplied to the stator 74, a magnetic field is created causing the rotor 72 to spin within the stator 74 generating a torque that is supplied to the gear box via one or more shafts.

The core 80 includes an inner diameter 104 and an outer diameter 106 that are each concentric with a center of the core 80. Mounting ears 108 are disposed radially outboard of the outer diameter 106. In the illustrated embodiment, the stator core 80 includes four mounting ears 108. The addition of the mounting ears 108 to the outer diameter 106 creates a generally rectangular cross section. Each of the mounting ears 108 may include an arcuate outer surface 110 and a tab 113 with a bolt hole 115. One or more cooling channels 114 are defined in at least one of the mounting ears 108. The cooling channel(s) 114 extends in the axial direction of the stator core and may extend completely through the core 80 from the first end face to the second end face. In the illustrated embodiment, each of the mounting ears 108 includes a plurality of cooling channels 114. The axial channels 114 may have a circular cross section, as shown, or any other suitable shape. As shown, the cooling channels of each ear 108 are grouped into first and second sets 116 and 118 on opposite sides of the tab 113. (Used herein, a "set" includes one or more cooling channels.) In other embodiments, each set may include one large channel that may have an irregular cross-sectional shape. A radial distance between the center of the core 80, i.e., centerline 75, and an inner most point, e.g., 120, of cooling channels 114 is greater than the radial distance between the center of the core and the outer diameter 106. This places the coolant channels 114 out of the yoke portion (region between the outer diameter and the base of the teeth) of the stator core 80. By moving the cooling channels 114 radially outboard of the yoke portion, the flux path of the electric machine is less affected than in designs having cooling channels extending through the yoke portion. Each of the laminations include individual features that cooperate to form the mounting ears and their associated features described above.

The stator core 80 is received within a housing 130 having a sidewall 132 and a cavity 136 configured to receive the stator core 80. The cavity 136 has a shape that substantially matches the shape of the stator core 80. In the illustrated embodiment, the housing 130 has an insertion end 135 and a bottom end 137 that is at least semi-enclosed to include a shoulder or stop for the stator core 80. The stator core 80 is received within the housing 130 through the insertion end 135 and bottoms out on the shoulder/stop.

Figure 4:
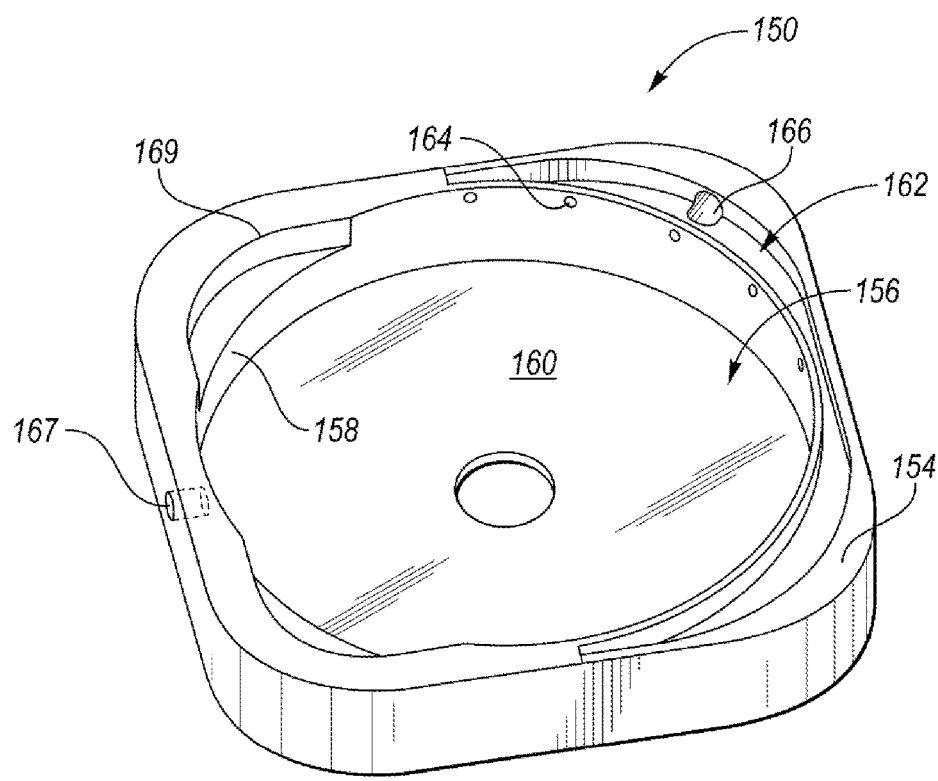
FIG. 4 is a perspective view of an end cover for one side of the electric machine according to one or more embodiments.

Referring to FIG. 4, the electric machine 70 includes a first end cover 150 that may connect to the insertion end 152 of the housing 130. The end cover 150 includes a flat face 154 that is configured to engage with the stator core 80 and/or the end 135 of the housing 130. A cavity 156 is recessed into the flat face 154 to define a void space for the end windings 98 that are received therein. The cavity 156 includes circumferential wall 158 and a radially oriented wall 160 (end wall or bottom wall). The flat face 154 defines an arcuate cooling channel 162, e.g., a semicircle, that surrounds a portion of the perimeter of the cavity 156. The circumferential wall 158 may define a plurality of cooling passages 164, e.g., circular holes, that extend between the cooling channel 162 and the cavity 156. The cooling passages 164 may extend radially relative to the centerline 75 of the electric machine 70. The cooling passages 164 are configured to circulate coolant or fluid, e.g., oil, from the channel 162 into the cavity 156 to cool the end windings. The end cover 150 may also define a main feed (supply) passage 166 that is in fluid communication with the circular cooling channel 162. The main feed 166 may be radially oriented and extend from a fitting (not shown) connected to the outer surface of the end cover 150. The main feed 166 is configured to connect with a thermal-management system associated with the electric machine 70. The cover 150 may further define a drain 167 for draining the fluid to a sump, e.g., a transmission sump. The drain may extend from the wall 158 to an exterior of the cover 150.

A pair of cutouts 169 may be recessed into the flat face 154 on the lower side of the cover 150. The cutouts 169 extend through to the circumferential sidewall 158 so that they are in fluid communication with the cavity 156. The cutouts 169 are located to be disposed over a corresponding one of the axial channels 114 when the end cover 150 is attached to the housing 130. The cutouts 169 allow fluid to flow from the axial channels to the drain 167 via the cavity 156.

The diameter of the cooling channel 162 is sized so that the channel 162 is disposed over corresponding ones of the axial channels 114 when the end cover 150 is attached to the housing 130. One or more seals or gaskets (not shown) may be applied between the end cover 150 and the housing 130 and/or the stator core 80 to retain the fluid within the desired channels and passages.

Figure 5:
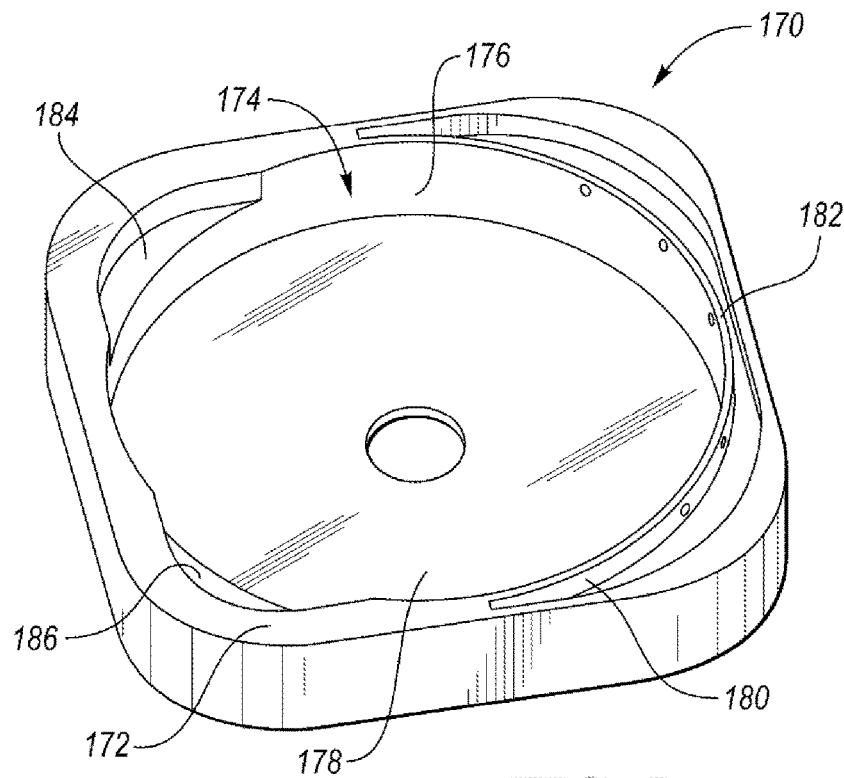
FIG. 5 is a perspective view of an end cover for the other side of the electric machine according to one or more embodiments.

Referring to FIG. 5, a second end cover 170 is connected to the other end of the housing 130. The end cover 170 includes a flat face 172 configured to engage with the stator core 80 and/or the housing 130. A cavity 174 is recessed into the flat face 172 to define a void space for the end windings that are received therein. The cavity 174 includes circumferential wall 176 and a radially oriented wall 178. The flat face 172 defines an arcuate cooling channel 180, e.g., a semicircle, that surrounds a portion of the perimeter of the cavity 174. The circumferential wall 176 may define a plurality of cooling passages 182, e.g., circular holes, that extend between the cooling channel 180 and the cavity 174. The cooling passages 182 may extend radially relative to the centerline 75 of the electric machine 70. The cooling passages 164 are configured to circulate fluid, e.g., oil, from the channel 162 into the cavity 156 to cool the end windings. A pair of cutouts 184 and 186 are recessed into the flat face 172 on the other side of the cover 170. The cutouts 184 extend through to the circumferential sidewall 176 so that they are in fluid communication with the cavity 174. The cutouts 184 and 186 are located to be disposed over a corresponding one of the axial channels 114 when the end cover 170 is attached to the housing 130. The cutouts 184, 186 allow fluid to flow from the cavity 174 and into the axial channels 114.

Figure 6:
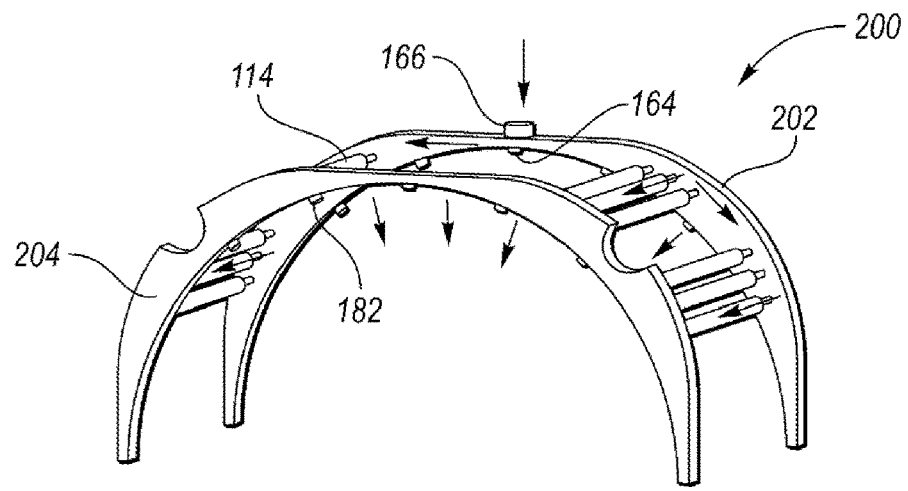
FIG. 6 is a negative of a cooling circuit.
Figure 6:
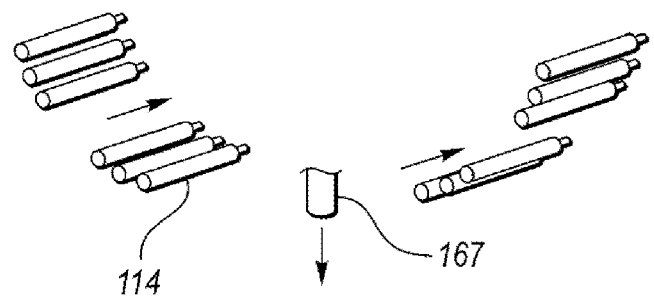

FIG. 6 illustrates a negative of the cooling circuit 200 associated with the electric machine 70. The cooling circuit 200 is configured to circulate a working fluid through the electric machine to facilitate thermal management thereof. The working fluid may be oil or any other dielectric fluid. Fluid enters the electric machine 70 through the main feed 166 and then accumulates within the cooling channel 162, which forms an inlet manifold 202. The manifold feeds the axial channels 114 and provides fluid to the drip passages 164 for cooling the end windings. The fluid travels axially through the stator core 80 via the channels 114 and accumulates within the arcuate cooling channel 180, which forms an outlet manifold 204. The outlet manifold 204 feeds the drip passages 182 to cool the end windings. The oil exiting the drip passages 182 collects in the bottom of the wall 176 due to gravity. The fluid pools in the bottom of the second cover 170. The cutouts 184, 186 allow the pooling fluid to flow to the axial channels 114, which convey the fluid back to the other end of the stator core where the drain 167 is located. The fluid circulating through the cooling circuit 200 absorbs heat from the electric machine 70 to provide cooling. The supply and the drain are connected to a thermal management system that is configured to dissipate the heat from the oil to the environment, such as through a heat exchanger. The thermal management system may include a pump or other means for circulating the fluid through the electric machine 70.

Figure 7:
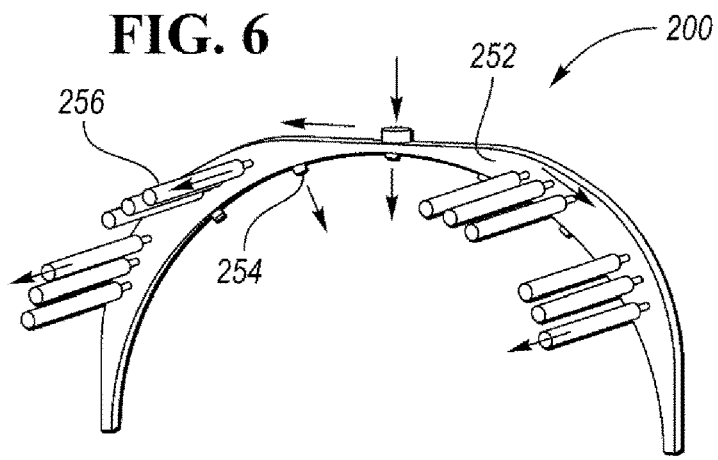
FIG. 7 is a negative of another cooling circuit.
Figure 7:
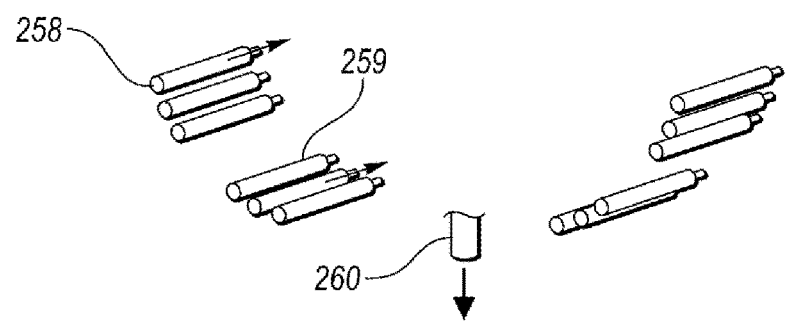

FIG. 7 illustrates a negative of the cooling circuit 250 according to an alternative embodiment. Here, the front end cover 150 may be used in conjunction with another end cover (not shown) that is different than the end cover 170. Again, the front cover 150 forms an inlet manifold 252 that provides drip cooling via the passages 254 and is in fluid communication with axial channels 256 extending through the stator core as described above. The axial channels 256 convey the fluid to the other side of the stator core. The back end cover is spaced apart from the exit ends 258 of the channels 256 allowing the oil to circulate out of the axial channels and contact the end windings. The fluid drains to the bottom of the back cover due to gravity and is conveyed back to the front cover via the lower axial channels 259. A drain 260 is provided in the front cover 150.

Figure 8:
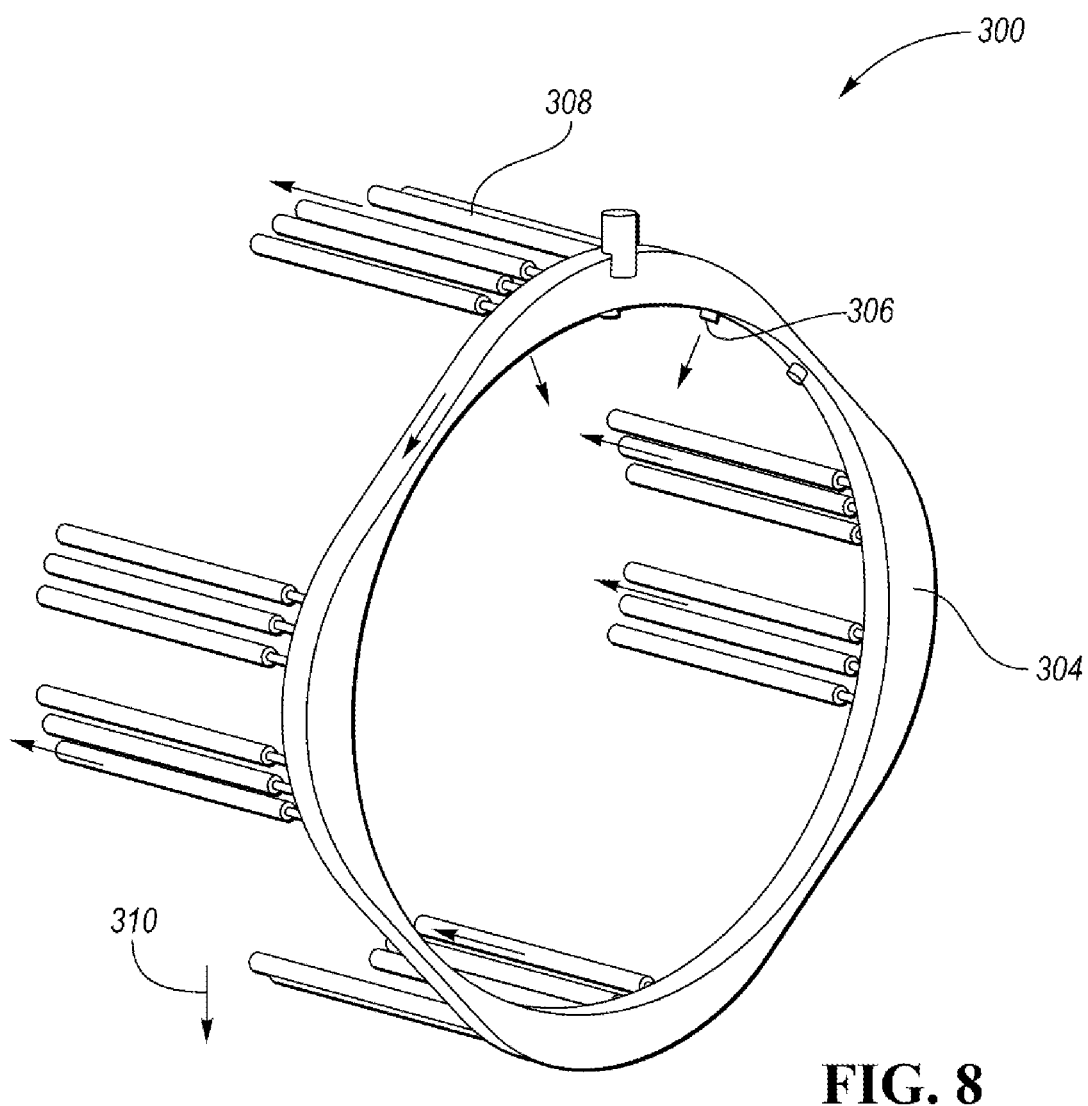
FIG. 8 is a negative of yet another cooling circuit.

FIG. 8 illustrates a negative of yet another cooling circuit 300 according to an alternative embodiment. Here, the front end cover is similar to 150, but is modified so that the circumferential channel is a complete circle to form a circular inlet manifold 302. The manifold 302 receives fluid form a supply 304. The uncover includes holes to provide fluid orifices 306 to cool the end windings. As the fluid pressure builds within the inlet manifold 304, the fluid passes through the axial cooling channels 308 to cool the stator core. The other end cover is spaced apart from the axial channels 308 allowing the now-heated fluid to circulate to the bottom of the other end cover and subsequently out the drain 310.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to, strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle electric machine comprising:
   a housing;
   a stator disposed in the housing and having teeth defining a plurality of axially extending slots supporting windings and further defining axially extending cooling channels each having an entrance port at one end of the stator and an exit port at the other end of the stator;
   a first end cover connected to a first end of the housing defining a recessed first cavity configured to receive the windings and defining an arcuate inlet manifold channel that extends in a circumferential direction of the stator to partially circumscribe the first cavity; and
   a second end cover connected to a second end of the housing and defining a recessed second cavity configured to receive the windings and defining an arcuate outlet manifold channel that extends in the circumferential direction to partially circumscribe the second cavity, wherein the second end cover defines a cutout that connects the second cavity in fluid communication with second ones of the axial cooling channels that are distinct from first ones of the axial cooling channels;
   wherein
   the first ones of the axial cooling channels have their entrance ports opening into the inlet manifold channel and their exit ports opening into the outlet manifold channel to form a cooling circuit configured to cool the electric machine.

2. The vehicle electric machine of claim 1, wherein the inlet manifold channel has an arc measure of 180 degrees or less.

3. The vehicle electric machine of claim 2, wherein the outlet manifold channel has an arc measure of 180 degrees or less.

4. The vehicle electric machine of claim 3, wherein the arc measure of the inlet manifold channel is substantially equal to the arc measure of the outlet manifold channel.

5. The vehicle electric machine of claim 1, wherein the first end cover defines cooling passages extending from the inlet manifold channel to the first cavity to drip cool the windings.

6. The vehicle electric machine of claim 5, wherein the second end cover defines cooling passages extending from the outlet manifold channel to the second cavity to drip cool the windings.

7. The vehicle electric machine of claim 1, wherein the second end cover defines cooling passages extending from the outlet manifold channel to the second cavity to drip cool the windings, wherein the cutout is configured to collect fluid exiting the cooling passages.

8. A vehicle electric machine comprising:
a housing;
a stator including windings and a stator core, wherein the core defines a plurality of axially extending cooling channels each having an entrance port at one end of the stator and an exit port at the other end of the stator; and
an end cover connected to a first end of the housing defining a recessed cavity configured to receive the windings and defining an arcuate inlet manifold channel that extends in a circumferential direction of the stator to partially circumscribe the first cavity and that is in fluid communication with first ones of the axial cooling channels, wherein the end cover defines a cutout that connects the cavity in fluid communication with second ones of the axial cooling channels that are distinct from the first ones of the axial cooling channels.

9. The vehicle electric machine of claim 8, wherein the inlet manifold channel has an arc measure of 180 degrees or less.

10. The vehicle electric machine of claim 8, wherein the end cover includes a flat face configured to engage with the housing and a circumferential wall defining the cavity.

11. The vehicle electric machine of claim 10, wherein the end cover defines the cutout recessed into the flat face and the circumferential wall, and wherein the cutout that connects the cavity is in fluid communication with the second ones of the axial cooling channels that are distinct from the first ones of the axial cooling channels.

12. The vehicle electric machine of claim 10, wherein the end cover further defines a fluid supply in fluid communication with the inlet manifold channel and a fluid drain in fluid communication with the axial cooling channels.

13. The vehicle electric machine of claim 8 further comprising another end cover connected to a second end of the housing and defining another recessed cavity configured to receive the windings and defining an arcuate outlet manifold channel that extends in the circumferential direction to partially circumscribe the another recessed cavity, wherein the first ones of the axial cooling channels have their entrance ports opening into the inlet manifold channel and their exit ports opening into the outlet manifold channel.

14. The vehicle electric machine of claim 13, wherein the inlet and outlet manifold channels have a same arc measure.

15. The vehicle electric machine of claim 14, wherein the arc measure is less than 180 degrees.

16. The vehicle electric machine of claim 8 further comprising another end cover connected to a second end of the housing and defining another recessed cavity configured to receive the windings.

17. A vehicle electric machine comprising:
a housing;
a stator core disposed in the housing and including mounting portions each defining at least one axial cooling channel;
windings disposed on the stator core;
a first end cover connected to a first end of the housing and defining a recessed first cavity configured to receive the windings and defining an arcuate inlet manifold channel that extends in a circumferential direction of the stator core to partially circumscribe the first cavity; and
a second end cover connected to a second end of the housing and defining a recessed second cavity configured to receive the windings and defining an arcuate outlet manifold channel that extends in the circumferential direction to partially circumscribe the second cavity; wherein
select ones of the axial cooling channels connect between the inlet manifold channel and the outlet manifold channel, and
one of the end covers defines a cutout that connects its cavity in fluid communication with at least one of the axial cooling channels.

18. The vehicle electric machine of claim 17, wherein the first end cover defines cooling passages extending from the inlet manifold channel to the first cavity to drip cool the windings.

* * * * *